US009302666B2

(12) United States Patent
Rindfleish et al.

(10) Patent No.: US 9,302,666 B2
(45) Date of Patent: Apr. 5, 2016

(54) APPLICATION OF BRAKING FORCE DURING ENGINE FORCE DISENGAGEMENT

(71) Applicant: Deere & Company, Moline, IL (US)

(72) Inventors: David Rindfleish, Dubuque, IA (US); Jamie Carr, Dubuque, IA (US); Jeremy Shuler, Durango, IA (US); Francois Stander, Dubuque, IA (US)

(73) Assignee: Deere & Company, Moline, IL (US)

( * ) Notice: Subject to any disclaimer, the term of this patent is extended or adjusted under 35 U.S.C. 154(b) by 530 days.

(21) Appl. No.: 13/707,952

(22) Filed: Dec. 7, 2012

(65) Prior Publication Data

US 2014/0162845 A1    Jun. 12, 2014

(51) Int. Cl.
| B60W 10/06 | (2006.01) |
| B60W 10/02 | (2006.01) |
| B60W 10/18 | (2012.01) |
| B60W 30/18 | (2012.01) |
| B60W 30/184 | (2012.01) |

(52) U.S. Cl.
CPC ............... *B60W 10/06* (2013.01); *B60W 10/02* (2013.01); *B60W 10/18* (2013.01); *B60W 30/184* (2013.01); *B60W 30/18054* (2013.01); *B60W 30/18109* (2013.01); *B60W 2300/17* (2013.01); *B60W 2300/44* (2013.01); *B60W 2540/12* (2013.01); *Y10T 477/6392* (2015.01); *Y10T 477/647* (2015.01)

(58) Field of Classification Search
CPC ... B60W 10/02; B60W 10/06; B60W 10/184; B60W 10/188; B60W 10/192; B60W 10/196; B60W 10/198
See application file for complete search history.

(56) References Cited

U.S. PATENT DOCUMENTS

| 6,039,673 A | 3/2000 | Mikami et al. |
| 6,411,881 B1 | 6/2002 | Thomas |
| 2005/0057090 A1 | 3/2005 | Kinser et al. |
| 2007/0168103 A1 | 7/2007 | Scelers |

FOREIGN PATENT DOCUMENTS

| EP | 0751325 A2 | 1/1997 |
| EP | 1 350 663 | 5/2005 |
| EP | 2 447 123 | 5/2012 |
| JP | 2007205452 A | 8/2007 |
| JP | 2008215139 | 9/2008 |

(Continued)

OTHER PUBLICATIONS

British Search report mailed Dec. 11, 2014 in related British application No. GB1222080.2.

*Primary Examiner* — Jacob S Scott
(74) *Attorney, Agent, or Firm* — Ingrassia, Fisher & Lorenz PC

(57) ABSTRACT

An apparatus for and method of controlling forces transmitted to wheels/tracks of a vehicle. The method includes receiving an electrical indication that a first brake is engaged, such as by a user pressing his foot to a service brake. The method further includes electrically transmitting an instruction to apply force restricting movement of the wheels, such as force exerted from a brake, in an amount above a first threshold, such as an amount necessary to unilaterally prevent movement. The method also includes electrically transmitting an instruction to reduce force being applied to the wheels from a transmission while the (brake) force above the first threshold is applied.

8 Claims, 4 Drawing Sheets

(56) References Cited

FOREIGN PATENT DOCUMENTS

| JP | 2008215139 A | 9/2008 |
|---|---|---|
| WO | WO2011/112138 A1 | 1/2011 |

APPLICATION OF BRAKING FORCE DURING ENGINE FORCE DISENGAGEMENT

FIELD

The present disclosure relates to disengagement of engine force and, more particularly, to the automatic application of brake pressure during disengagement of engine force.

BACKGROUND

When vehicles are stopped, force exerted by an engine and propagated via a transmission or drivetrain generally can be working against braking forces that are applied. When the drivetrain forces are working against the braking forces, the energy being applied can be converted into heat. Some of this heat is generated at the transmission. Excess heat in the drivetrain can result in part wear. Additionally, while at odds, the competing forces from the drivetrain and brake are not producing useful outcomes. Accordingly, the resources expended in creating the force from the drivetrain, such as the fuel consumed by the engine, is wasted.

In other instances, such as when the vehicle is stopped and facing uphill, the forces exerted by the engine and propogated via the transmission aid in keeping the vehicle stationary. Accordingly, braking forces applied that when added to the force being applied via the drivetrain are satisfactory to keep a vehicle stationary, may not be satisfactory to keep the vehicle stationary if such drivetrain forces were not present.

SUMMARY

The present disclosure provides a method of controlling forces transmitted to wheels/tracks of a vehicle. The method includes receiving an electrical indication that a first brake is engaged, such as by a user pressing his foot to a service brake. The method further includes electrically transmitting an instruction to apply force restricting movement of the wheels, such as force exerted from a brake, in an amount above a first threshold, such as an amount necessary to unilaterally prevent movement. The method also includes electrically transmitting an instruction to reduce force being applied to the wheels from a drivetrain while the (brake) force above the first threshold is applied.

According to an embodiment of the present disclosure, a work machine is provided including an engine; a transmission coupled to the engine; at least one ground engaging member selectively driven by the transmission; a first brake operable to restrict motion of the at least one ground engaging member; a brake operation detector operable transmit a first brake operation signal indicative the operational status of the first brake; a brake engagement device operable to selectively engage and disengage the first brake; a engine engagement controller operable to selectively engage and disengage the engine to and from the at least one ground engaging member; and a controller operable to transmit a signal to the engine engagement controller to cause disengagement of the engine from the at least one ground engaging member upon receiving an indication that the first brake is being applied and upon the brake engagement device applying the first brake to supply force above a first threshold.

According to another embodiment of the present disclosure, a method of controlling force transmitted to a ground engaging member of a vehicle is provided. The method including receiving an electrical indication of conditions indicative of heat buildup in a transmission above a first threshold amount; and electrically transmitting an instruction to engage a first brake to apply force above a second threshold amount.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
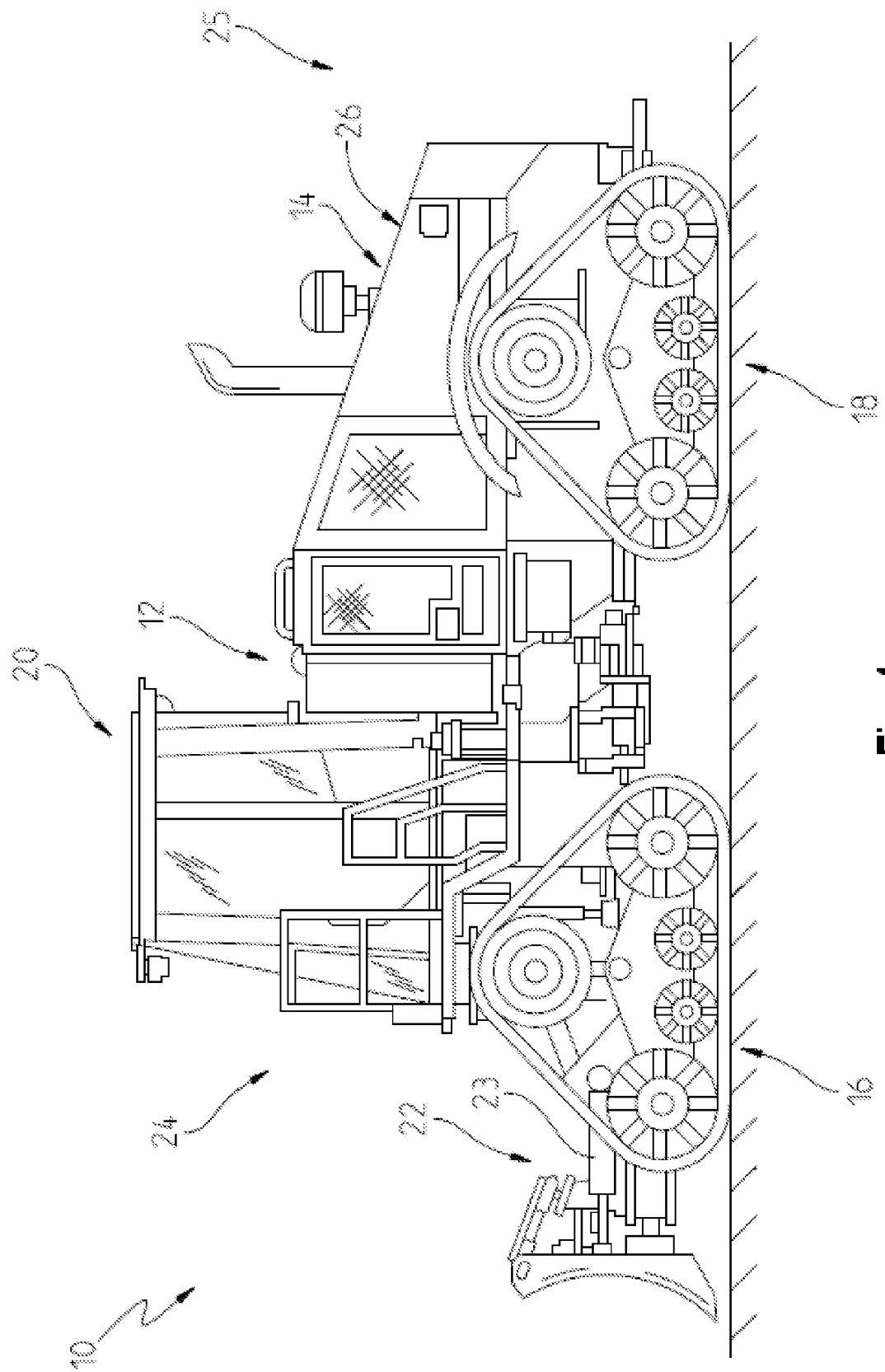
FIG. 1 is a plan view of a work vehicle according to an exemplary embodiment of the present disclosure.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIG. 1, a construction or engineering vehicle 10 is provided in the form of an articulated bulldozer. Although the vehicle is illustrated and described herein as a bulldozer, the vehicle may be in the form of a tractor, a dump truck, a motor grader, an excavator, a crawler, or another agricultural or utility vehicle, for example. Vehicle 10 includes a chassis 12, an engine 14, and a ground-engaging mechanism, illustratively, front tracks 16 and rear tracks 18. It is also within the scope of the present disclosure that the ground-engaging mechanism of vehicle 10 may include wheels, for example. In use, engine 14, in cooperation with a transmission 30, drives front tracks 16 and rear tracks 18, causing vehicle 10 to propel across the ground. Engine 14 may be a combustion engine or an electric engine including an electric generator and at least one electric motor. For example, the electric generator and electric motor may cooperate with engine 14 and the ground-engaging mechanism to move vehicle 10.

Vehicle 10 of FIG. 1 also includes an operator cab 20 coupled to chassis 12 to house and protect the operator of vehicle 10. Operator cab 20 may include foot pedals, a steering wheel, joysticks, monitors, and other controls (not shown).

The illustrative embodiment of vehicle 10 of FIG. 1 further includes a work tool in the form of an articulating blade 22. Other vehicles contemplated in this disclosure may include suitable work tools, such as a dump or haul body, forks, tillers, and mowers. Articulating blade 22 is moveably coupled to chassis 12 for pushing and/or clearing dirt and other materials. At least one hydraulic cylinder 23 may be provided to operate articulating blade 22. The operator may control the movement of articulating blade 22 using joysticks or other controls located within operator cab 20.

FIG. 1 further shows a front end 24 and back end 25 of vehicle 10. Front end 24 includes operator cab 20 and front tracks 16. Back end 25 includes an engine compartment 26 and rear tracks 18. Alternative embodiments of the vehicle may be configured to support engine compartment 26 forward of operator cab 20. Engine compartment 26 may be supported by chassis 12 and comprised of a plurality of support members forming a frame (not shown). Engine compartment 26 houses at least part of transmission 30 and engine 14.

Figure 2:
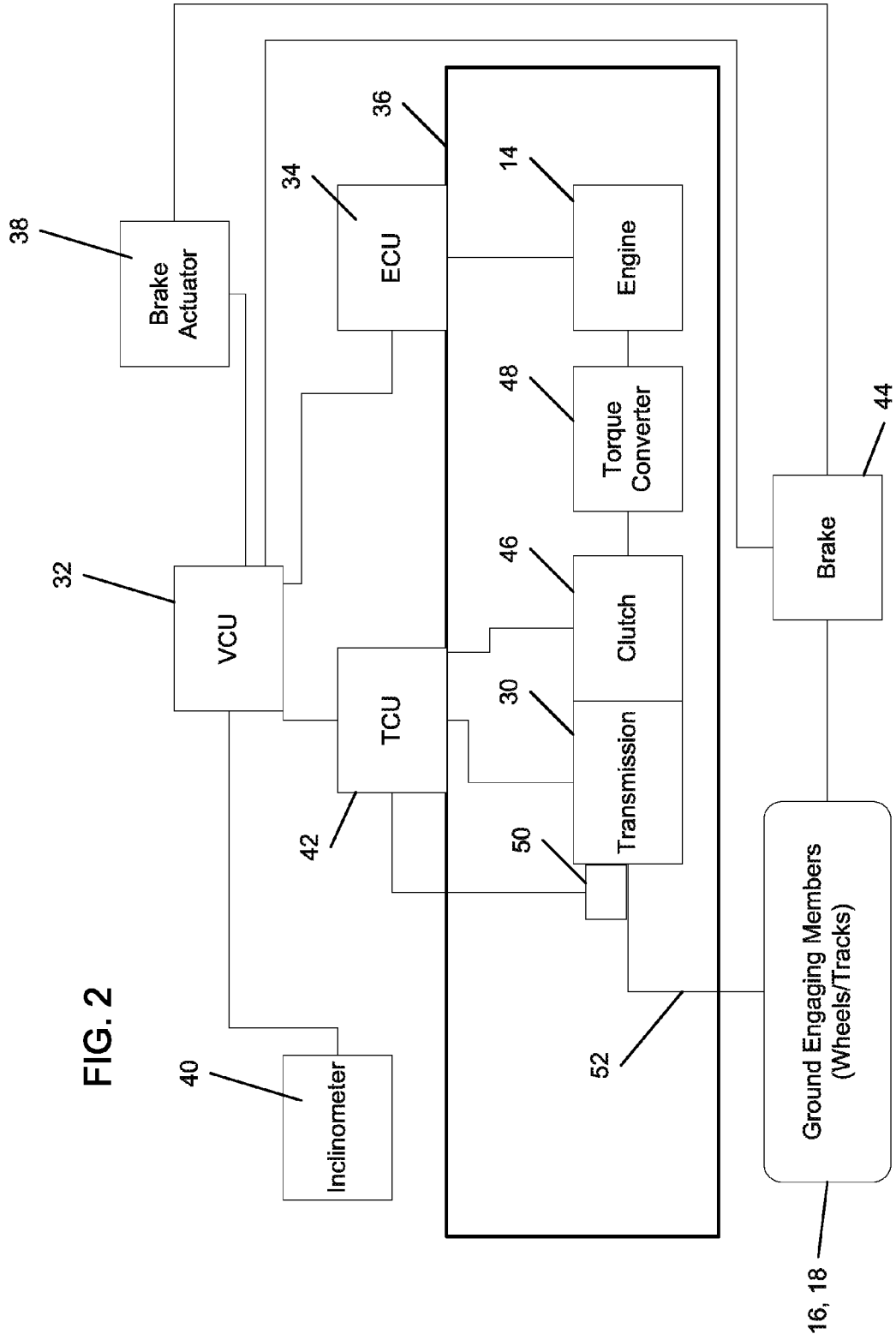
FIG. 2 is diagrammatic view showing components of the exemplary embodiment work machine of FIG. 1.

As shown in FIG. 2, vehicle 10 includes vehicle control unit (VCU) 32, engine control unit (ECU) 34, drivetrain 36, brake actuator 38, inclinometer 40, transmission control unit 42 (TCU) and brake 44. VCU 32 is an electronic control module that controls various vehicle systems, including other electronic control modules for various subsystems (such as ECU 34 and TCU 42).

Drivetrain 36 includes engine 14, clutch 46, transmission 30, torque converter 48, and shaft speed sensor 50. Clutch 46 selectively allows or prevents for power from engine 14 to be applied to transmission 30. It should be appreciated that drivetrain 36 includes multiple clutches. Clutch 46 is discussed as being a "master clutch" that controls all transfer of engine output. However, the concepts described herein can be utilized with any clutch in drivetrain 36. More specifically, the concepts described herein can be utilized with any clutch operationally positioned between engine 14 and ground engaging members 16, 18. Engine 14 outputs rotational motion on a shaft that is coupled to torque converter 48. Torque converter 48 sends power to transmission 30 via clutch 36. Clutch 36 is illustratively internal to transmission 30. Transmission 30 applies various gearing to allow customization in the application of the rotational motion to output shaft 52 that powers ground engaging members 16, 18. Shaft speed sensor 50 detects rotation of output shaft 52 and supplies a signal to TCU 42 indicative thereof. The signal from shaft speed sensor 50 is then communicated from TCU 42 to VCU 32.

Brake actuator 38 is illustratively a brake pedal operative to apply service brake 44. Brake actuator 38 further supplies a signal to VCU 32 that indicates an operational status of brake actuator 38. Such a signal can be used to activate brake lights (not shown) or for other uses, such as those described herein.

Inclinometer 40 is an instrument for measuring angles of slope. Specifically, inclinometer 40 measures the slope assumed by vehicle 10. Inclinometer 40 produces an electronic signal indicative of the slope angle assumed by vehicle 10 and supplies that signal to VCU 32.

TCU 42 an electronic control module that controls operation of transmission 30. TCU 42 operates at least partially at the direction of VCU 32.

Brake 44 is illustratively a service brake. Brake 44 operates upon engagement of brake actuator 38. Brake 44 is further operable to respond to commands from VCU 32. Although brake 44 is described herein as a service brake, embodiments are envisioned where the brake controlled by VCU 32 is a parking brake or other brake. Brake 44 operates to inhibit motion of ground engaging members 16, 18 and to inhibit rotation of output shaft 52. Accordingly, while brake 44 can be monitored, the applied brake discussed below can be a brake other than brake 44.

At the outset, vehicle 10 operates in a conventional manner with drivetrain 36 providing power to ground engaging members 16, 18 to translate vehicle 10 across terrain. As part of this operation, clutch 46 is engaged to permit powering of ground engaging members 16, 18 (block 700). VCU 32 operates a pair of timers, Timer 1 and Timer 2. Embodiments are envisioned where the timers are operated by a different electronic control unit, provided that the inputs, described herein are provided to that electronic control unit. Timer 1 operates to keep track of time that brake actuator 38 is activated while the torque converter 48 output to output shaft 52, as measured by shaft speed sensor 50, is zero. Thus, timer 1 counts the time that brake actuator 38 is pressed and that ground engaging members 16, 18 are stationary. Timer 2, which is discussed more later, is operable to count the time that brake actuator 38 has been released.

Timer 1 and Timer 2 are reset to a value of zero, block 710. VCU 32 then proceeds to wait for signals (from brake actuator 38 and shaft speed sensor) that the conditions of brake actuator 38 being active and that output of torque converter 48 is zero, block 720. For as long as one of these conditions is not met, VCU 32 loops to continue waiting for these conditions to be satisfied.

When the conditions are satisfied, VCU 32 then inquires as to how long the conditions have been satisfied and as to whether the elapsed time is greater than or equal to a defined threshold, block 730. If the elapsed time is not greater than or equal to the defined threshold, Timer 1 is incremented, block 740. VCU 32 again checks to confirm that the conditions (brake applied and torque output=0) are satisfied, block 720.

When the conditions are satisfied and have been for greater than or equal to the defined threshold such that Timer 1≥Timeout, VCU 32 sends a signal to activate or latch brake 44 to a threshold, block 750. VCU 32 thereby applies brake 44 to apply a threshold amount of force. The threshold amount is illustratively an amount of force necessary to unilaterally prevent movement of vehicle 10. To this end, the determination of the threshold may take into account the orientation of vehicle 10, via data received from inclinometer 40 or otherwise. It should be appreciated that activation of brake actuator 38 is a binary function such that all brake application is reported equally. Thus, based on the binary signal from brake actuator 38, the degree to which brake 44 is actuated is not known.

Once brake 44 is latched to apply force at or above the defined threshold, VCU 32 sends signals to TCU 42 instructing disengagement of clutch 46, block 755. Prior to disengagement of clutch 46, the output of engine 14 is being translated, via drivetrain 36, to ground engaging members 16, 18 and such output is being opposed by brakes 44. Such opposition places stress on engine 14 and other parts of drivetrain 36. Such stress results in the creation of heat and increased wear on engine 14 and other parts of drivetrain 36. This stress further causes engine 14 to consume an increased amount of fuel relative to an unstressed condition. Disengagement of clutch 46 reduces the stress experienced by engine 14 and drivetrain generally. Accordingly, less wear is placed on drivetrain generally, and engine 14 is able to consume less fuel than it would otherwise consume.

VCU 32 then proceeds to monitor vehicle 10 to determine when brake actuator 38 is released, block 760. For so long as brake actuator 38 remains active, VCU 32 continues to monitor brake actuator 38. When VCU 32 receives an indication that brake actuator 38 is no longer active, VCU 32 sends signals to TCU 42 to engage clutch 46. VCU 32 further starts to increment Timer 2, block 765. For so long as Timer 2 is below the pre-set timeout level, block 770, the status of brake actuator 38 continues to be monitored, block 780. For so long as brake actuator 38 continues to be de-activated, Timer 2 is incremented, block 785. If brake actuator 38 is re-activated before Timer 2 reaches the timeout level, Timer 2 is reset to zero, block 790, and VCU 32 continues to monitor the status of brake actuator 38. Once Timer 2 reaches the timeout level, VCU 32 issues a signal to release brake 44 latch, block 795. VCU 32 then resets Timers 1 and 2, block 710, and continues monitoring brake actuator 38 and shaft speed sensor 50, block 720.

In another embodiment, rather than waiting a set amount of time (Timer 2) after detection of brake actuator 38 deactivation, an embodiment is envisioned where a torque output of the transmission that needed to hold vehicle 10 in place (by being able to overcome gravity in view of a received indication of incline or otherwise) is determined. A signal to disengage the brake is sent when the torque output of the engine is determined to be greater enough to produce the needed force to hold vehicle 10 in place.

It should be appreciated that while the above description discusses instructions present within and executed by VCU 32, embodiments are envisioned where various functions are carried out by other parts. Such other parts may or may not communicate their actions to VCU 32. In one example the operation of engagement and/or disengagement of clutch 46 is controlled via a part other than VCU 32 and the engagement/disengagement status of clutch 46 is not communicated to VCU 32. In such embodiments, VCU 32 continues to monitor the application of brake actuator 38 and signals generated by shaft speed sensor 50. VCU 32 then engages brake 44 at the threshold force in anticipation of disengagement of clutch 46 by such other part. However, the above operation is described where disengagement of clutch 46 is dependent upon receiving permission from VCU 32 or some other part that is able to ascertain the status of brake 44 and whether brake 44 is latched at the threshold force.

Figure 3:
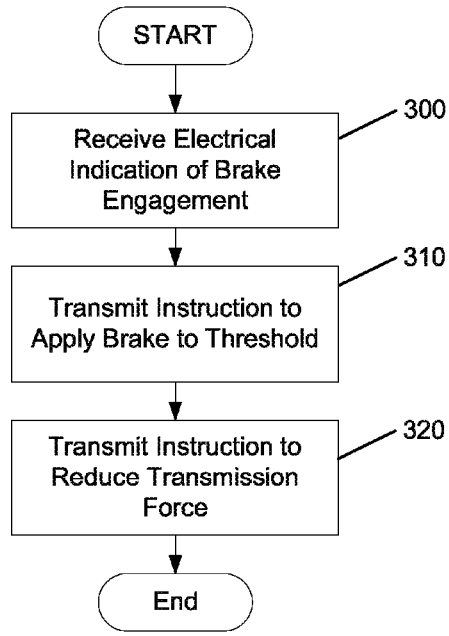
FIG. 3 is a flowchart showing exemplary operation of the work machine of FIG. 1.

In reiteration of above described modes and with reference to FIGS. 3-6 operation of the system of vehicle 10 is again described. As shown in FIG. 3, a signal is received that indicates that brake actuator 38 is depressed, block 300. An instruction is then transmitted to apply brake 44 to a threshold, such as full application, block 310. Then, an instruction is transmitted to reduce force being applied by transmission 30 to ground engaging members 16, 18, such as by disengaging clutch 46, block 320.

Figure 5:
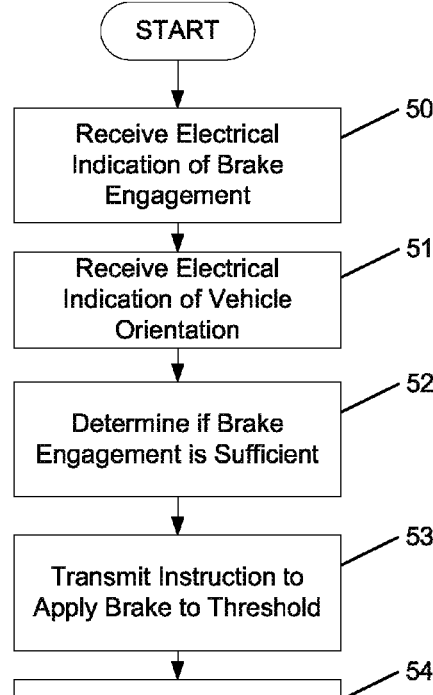
FIG. 5 is a flowchart showing yet another embodiment of exemplary operation of the work machine of FIG. 1.

In another embodiment, shown in FIG. 5, a signal is received that indicates that brake actuator 38 is depressed, block 400. A signal is further received that indicates vehicle orientation, such as a signal from an inclinometer, block 510. In an optional step, a determination can be made of whether the brake force currently applied is sufficient to hold vehicle 10 in place given what is known about the orientation of vehicle 10, block 520. Regardless of whether the determination is made, a signal is then sent to cause engagement of brake 44 with enough force to hold vehicle 10 in place given what is known about the orientation of vehicle 10, block 530. Then, an instruction is transmitted to reduce force being applied by transmission 30 to ground engaging members 16, 18, such as by disengaging clutch 46, block 540.

Figure 4:
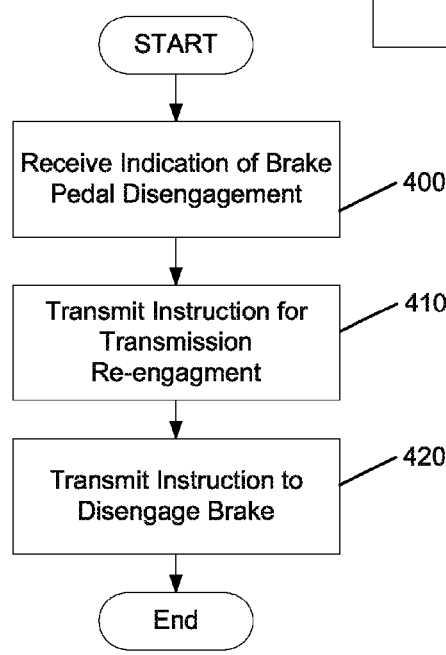
FIG. 4 is a flowchart showing another embodiment of exemplary operation of the work machine of FIG. 1.

In another embodiment, shown in FIG. 4, a signal is received (or a signal is stopped) so as to provide an indication that brake actuator 38 is disengaged, block 400. A signal is then sent instructing for re-engagement of transmission 30, such as by re-engagement of clutch 46, block 410. A signal is then transmitted that instructs for disengagement of brake 44, block 420.

Figure 6:
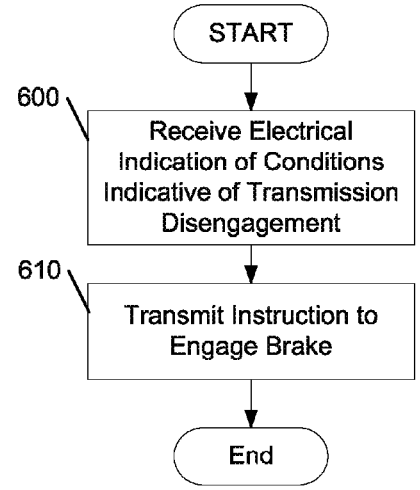
FIG. 6 is a flowchart showing yet another embodiment of exemplary operation of the work machine of FIG. 1.
Figure 7:
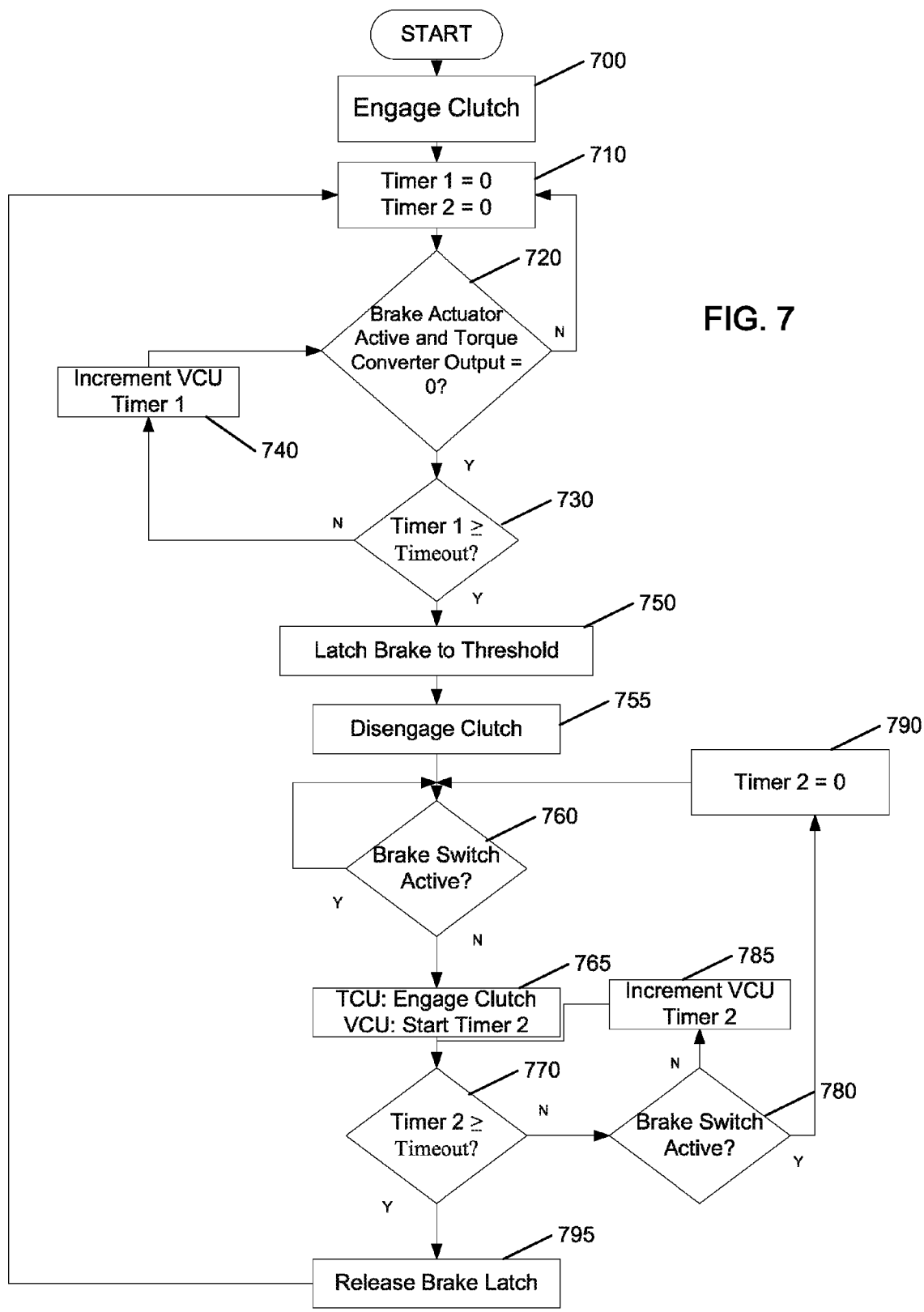
FIG. 7 is a flowchart showing yet another embodiment of exemplary operation of the work machine of FIG. 1.

In still another embodiment, shown in FIG. 6, a signal is received that indicates conditions that are known to be conditions in which transmission 30 is disengaged, such as by disengagement of clutch 46, block 600. A signal is then sent that instructs for engagement of brake 44, block 610.

The above-described apparatus and method provide that adequate brake force is being applied to prevent movement of vehicle 10 before or as force generated by engine 14 is disconnected from ground engaging members 16, 18.

In yet another embodiment, a temperature sensor (not shown) is provided on transmission 30 or another part of drivetrain 36. A signal to engage brake 44 to the latch threshold is then sent once brake actuator 38 is depressed and the temperature is determined to be above a threshold. Such threshold is indicative of expected disengagement of clutch 46.

In another embodiment, activation of a throttle, such as a gas pedal, is monitored and used to determine when brake 44 can be released. In such an embodiment, brake 44 would only be release when the gas pedal is pressed above a threshold (such as 20% of its travel).

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A method of controlling force transmitted to a ground engaging member of a vehicle including:
    receiving an electrical indication that a first brake is engaged;
    electrically determining that the first brake has been engaged for a prescribed time period;
    after determining that the first brake has been engaged for the prescribed time, electrically transmitting an instruction to an actuator of the first brake apply force restricting movement of the ground engaging member in an amount above a first threshold; and
    electrically transmitting an instruction to reduce force being applied to the ground engaging member via a drivetrain while force above the first threshold is applied by the first brake.

2. The method of claim 1, wherein the instruction to reduce force being applied includes an instruction to disconnect a directional clutch.

3. The method of claim 1, further including receiving an electrical indication that the first brake is disengaged and electrically transmitting an instruction to increase force applied to the ground engaging member via the drivetrain.

4. The method of claim 1, wherein electrically transmitting an instruction to apply force includes transmitting a signal to apply a second brake, the method further including electrically transmitting an instruction to disengage the second brake.

5. The method of claim 4, wherein the instruction to disengage the second brake is transmitted at a set time after an instruction to increase force applied to the ground engaging member via the drivetrain is transmitted.

6. The method of claim 1, wherein an instruction to disengage a second brake is transmitted upon receiving an indication that a throttle of the vehicle has been engaged by a first amount.

7. The method of claim 1, further including receiving an indication of an incline of the vehicle and receiving an indication of the weight of the vehicle, determining a first torque output of the transmission needed to overcome gravity in view of the received indications of incline and weight, and electrically transmitting an instruction to remove the force restricting movement of the ground engaging member when the torque output of the engine is determined to be greater than or equal to the first torque output.

8. The method of claim 1, wherein the first brake is a service brake.

\* \* \* \* \*